Aug. 24, 1954     A. R. LINDSAY     2,687,325
AUTOMOBILE BODY, PARTICULARLY OF THE
COMBINED BODY AND CHASSIS TYPE

Filed Nov. 13, 1950     2 Sheets-Sheet 1

INVENTOR.
Alexander R. Lindsay
BY
Maurice A. Crews
ATTORNEY

Aug. 24, 1954     A. R. LINDSAY     2,687,325
AUTOMOBILE BODY, PARTICULARLY OF THE
COMBINED BODY AND CHASSIS TYPE
Filed Nov. 13, 1950     2 Sheets-Sheet 2
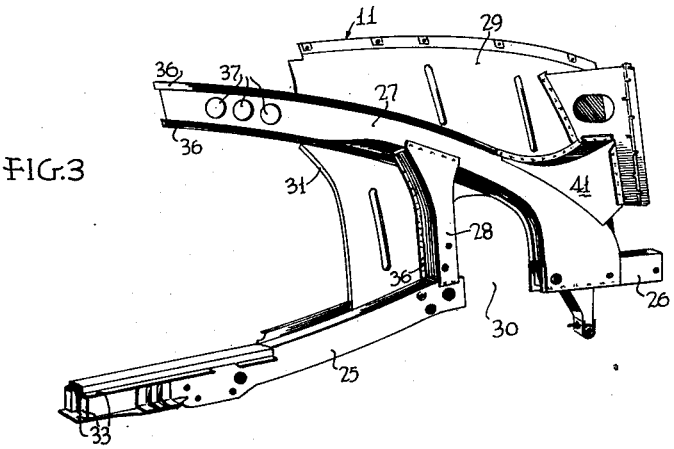
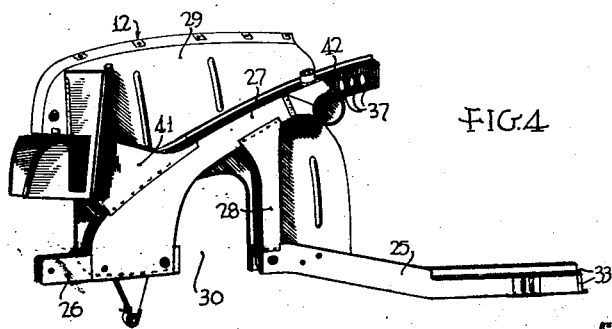
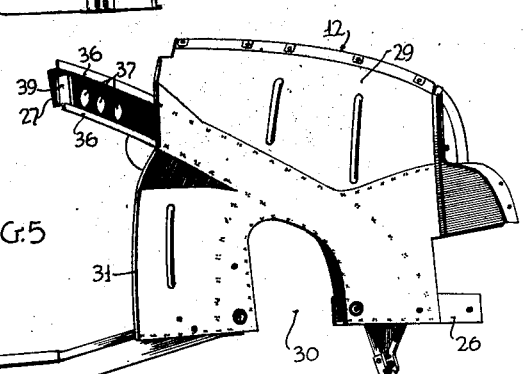
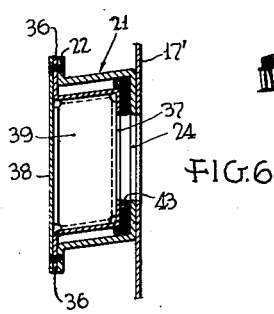
INVENTOR.
Alexander R. Lindsay
BY
Maurice A. Crews
ATTORNEY

Patented Aug. 24, 1954

2,687,325

UNITED STATES PATENT OFFICE 2,687,325

AUTOMOBILE BODY, PARTICULARLY OF THE COMBINED BODY AND CHASSIS TYPE

Alexander R. Lindsay, Detroit, Mich., assignor to The Budd Company, Philadelphia, Pa., a corporation of Pennsylvania Application November 13, 1950, Serial No. 195,264

11 Claims. (Cl. 296—28)

The invention relates to improvements in automobile bodies, particularly bodies of the frameless or self-supporting type in which body and chassis are combined into one integral structure.

Among the objects of the invention is the creation of an automobile body which combines light weight with adequate strength, which is simple in regard to the shape of its component parts and its completed structure, and which permits easy assembly of its individual parts into sub-assembly units and of such units with each other.

The aforesaid and other objects and advantages are achieved mainly by a novel formation and arrangement of inclined braces for longitudinal end sill structures and of connections of such braces with the adjoining central or main portion of the automobile body.

In regard to the final assembly of the automobile body of pre-assembled units, the invention may be considered as an improvement or further development of the invention disclosed in the inventor's co-pending application, Serial No. 166,889, filed June 8, 1950, now Patent No. 2,662,794, "Final Connection Between Pre-Assembled Units of Self-Supporting Automobile Bodies."

The features of the invention and its advantages will be more fully understood from the embodiment illustrated in the attached drawing and described in the following.

In the drawing:

Figures 3 and 4 are perspective inside elevations of forward extension units prior to their connection with the main body unit;

Figure 5 is a perspective outside elevation of the front extension unit shown in Figure 4; and Figure 6 is a fragmentary section on a larger scale along line 6—6 of Figure 2, illustrating the connection between the main body unit and the inclined brace of one of the forward extension units.

Figure 1:
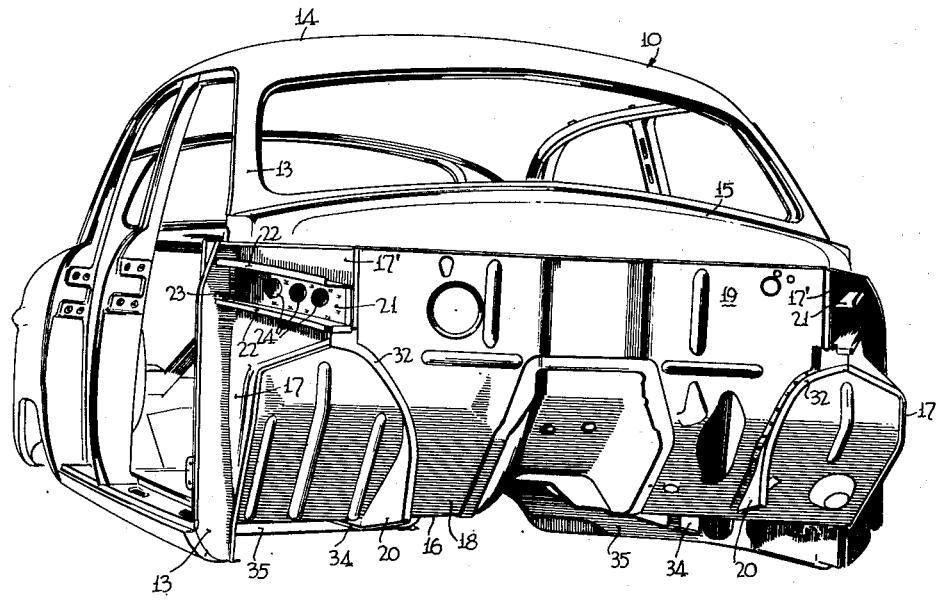
Figure 1 is a three-quarter front perspective of the main sub-assembly unit constituting the body proper and forming the passenger compartment.
Figure 2:
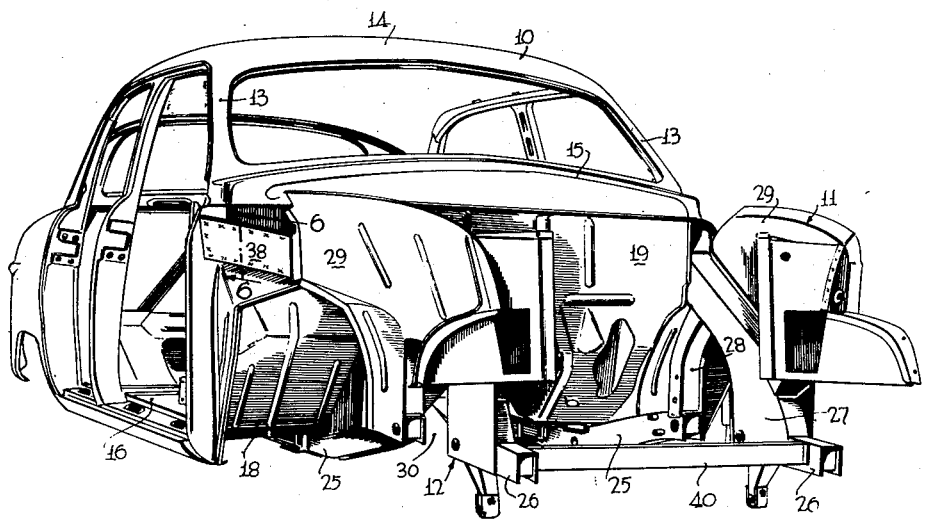
Figure 2 is a similar perspective showing the body unit per Figure 1 together with forward extensions, the latter forming a motor compartment and supports for motor and forward running gear.

The main body unit 10, front extension units 11 and 12, and the final assembly of the latter with the former are in many respects similar or identical with the disclosure in the inventor's aforesaid application, Serial No. 166,889, and his co-pending application, Serial No. 133,353, filed December 16, 1949, now Patent No. 2,636,744, "Cross Beam Attachment for Automobiles."

Certain features illustrated and described in the present application form the subject matter of application Serial No. 195,268, of Stanley C. Vahey, "Air Ducts for Automobiles," filed November 13, 1950, simultaneously with the present application. All of the aforesaid applications are owned by the assignee of the present application.

The central or main body unit 10 comprises front posts 13, interconnected by roof 14, cowl top 15, and floor panel 16. Cowl sides 17, forming portions of the body side walls, have their rear margins connected to the posts 13 and their front margins interconnected by toeboard 18 and dashboard 19. The top margins of cowl sides 17 and dashboard 19 are secured to the adjoining margins of cowl top 15.

Toeboard 18 and dashboard 19 are connected with outwardly projecting gussets or plates 20 serving for the attachment of the forward extensions 11, 12 in the same manner as disclosed in the inventor's aforesaid application, Serial No. 166,889.

The upper portion of each cowl side 17 is offset at 17' toward the longitudinal center plane of the body. Each offset portion 20 has secured to its outside an outwardly facing channel section 21 provided with marginal flanges 22 and secured by its rear end at 23 to the respective posts 13. The bottom wall of section 21 and wall 20 behind it are provided with large resigtering openings 24.

Offsets 17' in the cowl side wall 17 and the sections 21 secured to them are important features of the invention, and their purpose will become apparent from the following description of the forward body extensions 11, 12 and their connection in final assembly to the main body unit 10.

Each of the forward extension units 11 and 12 comprises a longitudinal sill structure 25, a sill extension 26, an outwardly and rearwardly inclined brace 27 emanating from extension 26, a vertical brace 28 interconnecting sill 25 and brace 27, and an inner wheel housing wall 29 structurally secured to and forming part of said sills and braces 25 to 28.

Recesses 30 formed in the extension units 11, 12 between members 25, 26, 27 and 28 and in walls 29 serve for the reception and attachment of a transverse wheel-supporting beam (not shown), as fully disclosed and claimed in the inventor's aforesaid application, Serial No. 133,353.

The rear margins of wheel housing walls 29 have outwardly projecting flanges 31 for overlapping securement to the flanges 32 of members 20 of main body unit 10. The side sill structures 25 extend rearwardly beyond the respective wheel housings 29 and are provided with flanges and tongues 33 for overlapping connection with mating members 34 provided on floor panel 16 and with a cross member 35 of main body unit 10. The details of these connections are not illustrated; they may be substantially the same as disclosed in the inventor's aforesaid application, Serial No. 166,889.

Braces 27 and 28 are outwardly facing hat sections secured by their marginal flanges 36 to the inside of the respective wheel housing wall 29.

Braces 27 project rearwardly beyond the respective wheel housing wall 29 and are arranged and shaped so as to fit in final assembly into the channel sections 21 provided on the cowl sides of the main body unit. The rearwardly extending portions of braces 27 have their bottom walls provided with openings 37, are closed on the outside by a cover plate 38 overlappingly secured to flanges 36, and are closed at the rearward end by inserts 39.

In final assembly the wheel housings 29 and the sills 25 are connected with the main body unit as disclosed in the inventor's aforesaid application, Serial No. 166,889, that is, a connection which can be made without reaching into the interior of the car.

The final connection between the braces 27 and the main body unit likewise does not require reaching into the interior of the car. The connection is made by overlappingly securing flanges 36 of braces 27 with flanges 22 of sections 21 of the main body unit. This connection can very easily be made by merely spot welding the overlapping flanges from the outside by means of portable spot welding tools. Other connecting means such as rivets could, of course, likewise be employed, though spot welding is preferred.

The two lateral forward extensions 11 and 12 have their sill extensions 26 interconnected, either before or after their connection to main body unit 10, by a cross brace 40.

In the completed structure each brace 27 with adjoining section 21 represents a continuous structure transferring stresses directly from front wheel supporting region into cowl sides 17 and forward body posts 13. This arrangement does away with the now commonly used braces in the interior of the car which are considered less effective and which are more difficult to install.

Braces 27 together with wheel housing walls 29 and cover plates 38 present closed box sections which may be used as air ducts. The air is admitted through scoops 41 and discharged through registering openings 24, 37. A further conduit 42 may connect the interior of one or both braces 27 with heating or other air-conditioning devices. 43 is a resilient gasket forming an air-tight seal of the space between brace 27 and section 21 around openings 24, 37. The formation of the braces as air ducts forms the subject matter of the aforesaid simultaneously filed application of Stanley C. Vahey, Serial No. 195,268, "Air Ducts for Automobiles."

Cowl side walls 17 with braces 27 attached to them will be covered in the completed body by fenders (not shown) secured along their margins to posts 13 and wheel housing walls 29.

The invention is not restricted to the details of the illustrated embodiment but is susceptible to modification. The features of arranging the braces on the outside of the cowl sides and their connection with the front posts may, for instance, be used independently of the connections by means of the flanged channel section 21. The invention may also be used for connecting the rear end of a main body unit with rearward body extensions.

What is claimed is:

1. In an automobile body, a main body portion forming a passenger compartment, a pair of posts, one on each side, near one end of the main body portion, side wall portions projecting longitudinally beyond and connected with said posts, extensions projecting longitudinally beyond said main body portion and comprising transversely spaced longitudinal side sill members and inclined braces, said sill members being connected to the lower part of the main body portion, said inclined braces extending between points of said sill members spaced from said main body portion and regions of said main body portion upwardly spaced from said sill members, said braces being extended over the outsides of said side wall portions to said posts and having their ends structurally connected to said posts.

2. In an automobile body, a main body portion forming the passenger compartment having side wall portions at one of its ends, transversely spaced longitudinal side sill members projecting longitudinally beyond said main body portion and being connected to the lower part thereof, inclined braces extending between points of said sill members spaced from said main body portion and a region of said main body portion upwardly spaced from said sill members, said braces being extended over the entire length of and structurally connected to the outsides of said side wall portions.

3. In an automobile body, a pre-assembled main body unit forming the passenger compartment, a pair of posts, one on each side, near one end of the main body unit, side wall portions projecting longitudinally beyond and connected with said posts, pre-assembled body extension units each comprising a longitudinal bottom sill member, an inclined brace and a panel secured to said sill member and brace, means for overlappingly connecting said sill members and said braces of said extension units, respectively, to the underside of said main body unit and to the outsides of said side wall portions, said braces being extended on the outsides of said side wall portions to and structurally connected with said posts.

4. In an automobile body, a main body portion forming the passenger compartment, a pair of posts, one on each side, near to but longitudinally spaced from one end of the said main body portion, side wall portions projecting beyond and connected with said posts, an end wall interconnecting said side wall portions, body extensions projecting beyond said end wall and comprising transversely spaced longitudinal bottom sill members, said sill members being overlappingly connected to the underside of said main body portion, said body extensions comprising also inclined braces extending between points of the sill members spaced from said main body portion and regions of the latter above said sill members, said braces extending on the outsides of said side wall portions to said posts and being structurally connected to said outsides.

5. In an automobile body, a pre-assembled main body unit forming the passenger compartment, a cowl at the front end of said main body unit, said cowl having side walls, a pair of body extension units each comprising a longitudinal bottom sill member, an inclined brace and a panel secured to said sill member and brace, means for overlappingly connecting said sill members and said panels to said main body unit, means forming part of said main body unit arranged on the outside of said cowl side walls, said braces having their rear end portions extended across the outsides of said cowl side walls and structurally connected to said means, said cowl side walls being inwardly recessed at least in their upper regions relative to rearwardly adjoining side wall portions for accommodating said means and said rear end portions of said braces.

6. In an automobile body, a main body portion forming the passenger comparment, a pair of posts, one on each side, near to but longitudinally spaced from one end of the said main body portion, side wall portions projecting beyond and connected with said posts, an end wall interconnecting said side wall portions, body extensions projecting beyond said end wall and comprising transversely spaced longitudinal bottom sill members, said sill members being overlappingly connected to the underside of said main body portion, said body extensions comprising also inclined braces extending between points of the sill members spaced from said main body portion and regions of the latter above said sill members, said side wall portions being connected with outwardly facing channel sections provided with marginal flanges, said braces fitting into said channel sections and being provided with marginal flanges overlapping and structurally connected to said flanges on said channel sections.

7. In an automobile body according to claim 6 in which said channel sections extend and are secured to said posts.

8. In an automobile body, a pre-assembled main body unit forming the passenger compartment, a cowl at the front end of said main body unit, said cowl having side walls inwardly recessed at least in their upper regions relative to rearwardly adjoining side wall portions, a body extension comprising a pair of transversely spaced longitudinal bottom sill members, inclined braces and panels, means for overlappingly connecting said sill members and said panels to said main body unit, sections forming part of said main body unit arranged on the outside of said recessed cowl side walls, said sections having outwardly and vertically extending walls and flanges, said braces being extended across said cowl side walls and being provided with vertically extending flanges, said flanges on said sections and on said braces overlapping and being structurally connected with each other in final assembly of said main body unit and said body extension.

9. In an automobile body, a main body portion forming the passenger compartment, a pair of posts, one on each side, near to but longitudinally spaced from one end of the said main body portion, side wall portions projecting beyond and connected with said posts, an end wall interconnecting said side wall portions, body extensions projecting beyond said end wall and comprising transversely spaced longitudinal bottom sill members, said sill members being overlappingly connected to the underside of said main body portion, said body extensions comprising also wheel housing panels and inclined braces extending between points of the sill members spaced from said main body portion and regions of the latter above said sill members, said braces being formed by outwardly facing hat sections secured by their marginal flanges to said panels, said braces extending longitudinally beyond said panels, said side wall portions being connected with outwardly facing channel sections provided with marginal flanges, said braces fitting into said channel sections and having their marginal flanges overlappingly and structurally connected to said flanges on said channel sections.

10. In an automobile body according to claim 9 in which said hat section braces in their regions extending beyond said panels are closed by cover plates.

11. In an automobile body: a main body portion forming the passenger compartment having side wall portions at one of its ends; transversely spaced longitudinal side sill members projecting longitudinally beyond said main body portion and being connected to the lower part thereof; inclined, elongated, hollow channel section braces extending between points of said sill members spaced from said main body portion and a region of said main body portion upwardly spaced from said sill members, said braces being extended in substantially their full channel section over the outsides of said side wall portions and being structurally connected to the latter by attaching means at points longitudinally spaced sufficiently from each other for obtaining a bending resistant connection between said braces and said side wall portions.

References Cited in the file of this patent

UNITED STATES PATENTS

| Number | Name | Date |
| --- | --- | --- |
| 2,160,271 | Kliesrath | May 30, 1939 |
| 2,306,416 | Waterhouse, Jr. | Dec. 29, 1942 |
| 2,539,050 | Begg | Jan. 23, 1951 |